United States Patent

[11] 3,542,353

[72] Inventor Albert F. Hickman
    8009 N. Gowanda State Road, Eden, New York 14057
[21] Appl. No. 732,799
[22] Filed May 7, 1968
[45] Patented Nov. 24, 1970

[54] COMPRESSION RUBBER SPRING
    8 Claims, 5 Drawing Figs.
[52] U.S. Cl. .................................................. 267/63,
    267/141, 267/153
[51] Int. Cl. .................................................. F16f 1/36
[50] Field of Search .................................. 267/1(53),
    1(40), 1(41), 63

[56]    References Cited
    UNITED STATES PATENTS
2,596,780  5/1952  Meyers et al. ............... 267/63
2,659,595  11/1953  Coda ........................... 267/63

FOREIGN PATENTS
971,498  10/1965  Great Britain ............... 267/1(53)

Primary Examiner—James B. Marbert
Attorney—Harold I. Popp

ABSTRACT: Whether made by extrusion or conventional molding, the friction free rubber body has a central through opening generally parallel with its mounting face to provide a base and integral body side walls connected by an integral top arch against which the force is impressed through the side body walls and base against the mounting face. The base, side body walls and top arch are preferably generally rectangular in section transversely of the line of force to permit of varying the capacity of the spring by merely making it longer or shorter and the central opening, in addition to (1) providing forced ventilation and cooling in use permits of (2) making large heavy duty springs without excessive wall thickness, (3) providing springs having the optimum response characteristics in service and (4) eliminating bond stress at the mounting face.

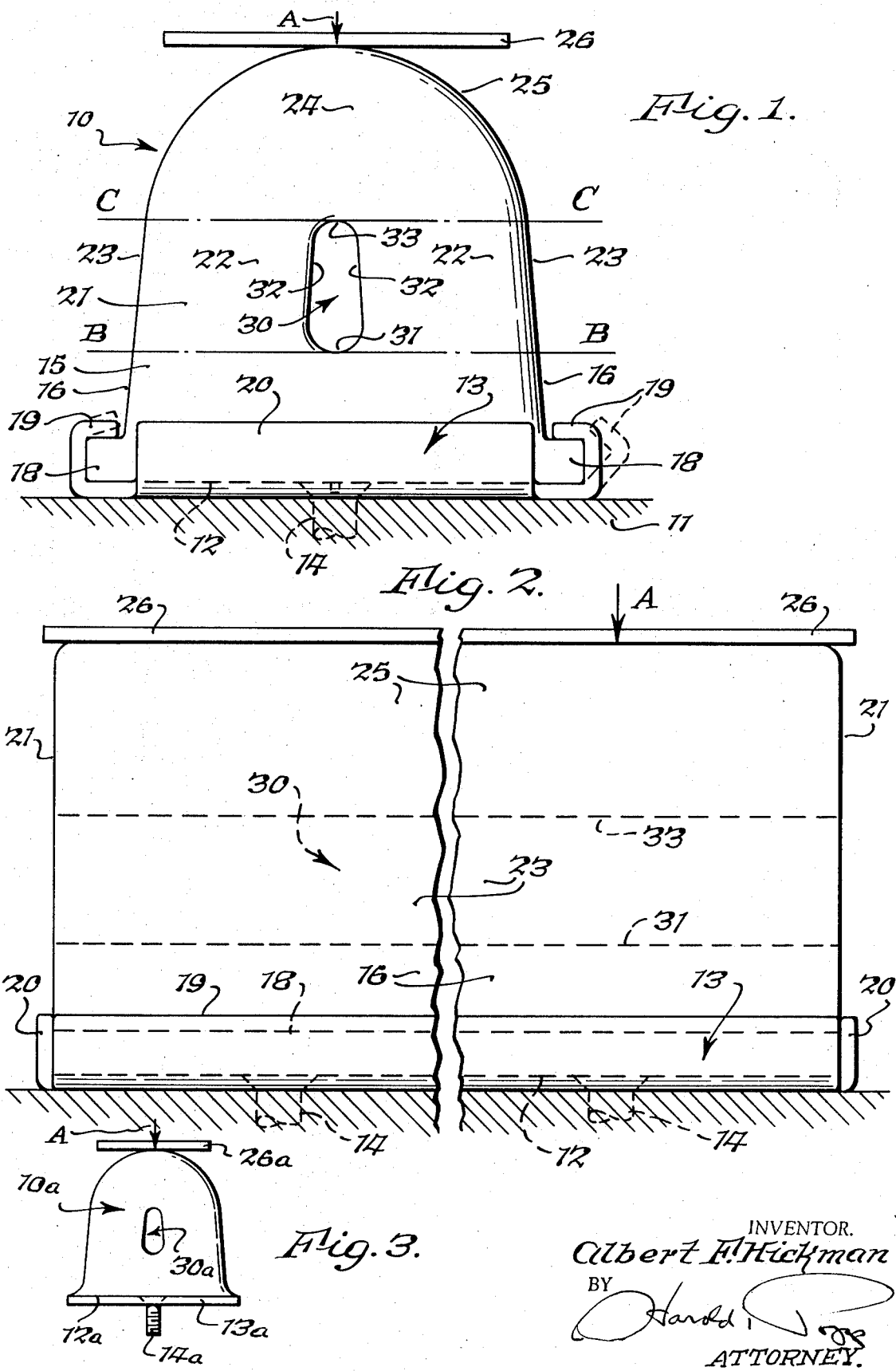

COMPRESSION RUBBER SPRING

Figure 4:
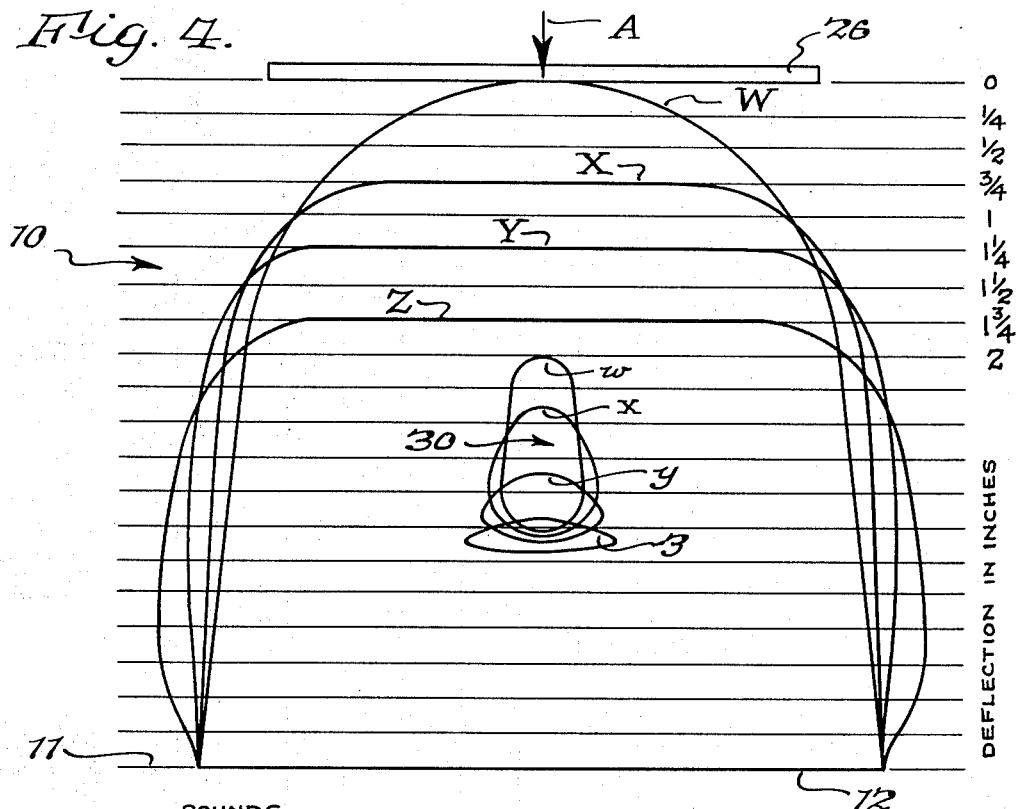
Figure 5:
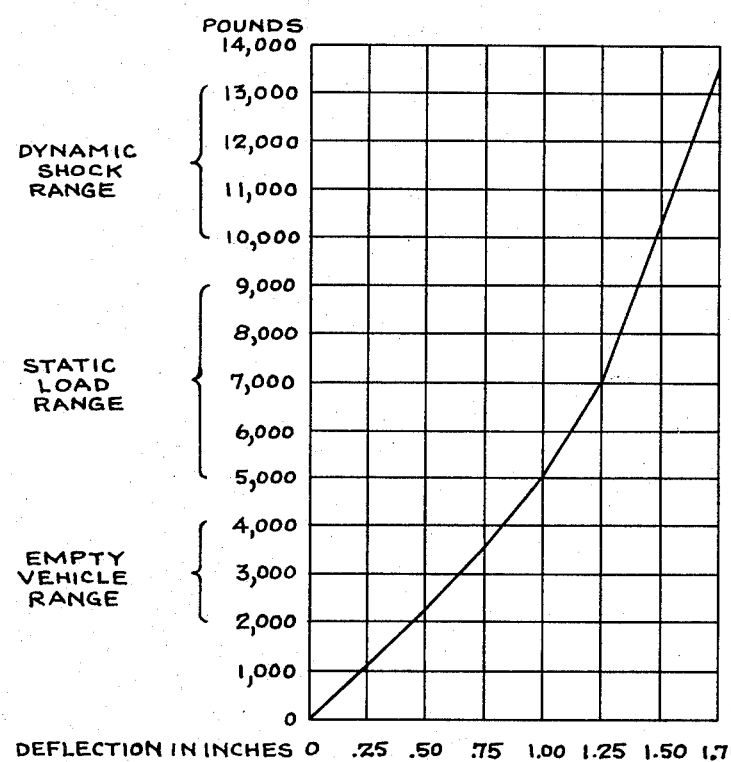

In the accompanying drawings, FIG. 1 is an end elevational view of a resilient rubber compression spring embodying the invention. FIG. 2 is a fragmentary side elevational view thereof. FIG. 3 is a diminutive view similar to FIG. 1 showing a modified form of mounting means. FIG. 4 is an end elevational diagrammatic representation of the resilient rubber compression spring body shown in the preceding figures and illustrating the progressive distortion thereof in response to uniformly increasing increments of force applied to the top thereof. FIG. 5 is a graph of the response of the resilient rubber compression spring body as illustrated in FIG. 4, the increasing increments of applied pressure being plotted against increments of deflection of the body in the direction of the line of force.

While not limited to any particular service, examples of practical use of the present invention are illustrated in my copending U.S. Pat. applications for Spring Suspensions Ser. No. 591,899 filed Nov. 3, 1966, now U.S. Pat. No. 3,410,573, exemplifying a heavy duty vehicle suspension, and Ser. No. 629,546 filed Apr. 10, 1967, now U.S. Pat. No. 3,437,347, exemplifying a light duty vehicle suspension and in both of which examples resilient rubber compression springs, such as the subject of the present invention, provide the preponderance of the resilient support for the vehicle frame on its rubber tired wheels.

The present resilient rubber compression spring has a rubber body 10 carried by a support 11 and adapted to provide resilient resistance to a line of force A applied to its top exterior side generally through the center of the body against a mounting face 12 on the side of the body opposite from the application of the line of force A and arranged generally perpendicular to this line of force. This mounting face 12 is shown as bearing against a mounting plate 13 secured, as by a stud bolt 14 to the support 11.

The invention essentially resides in the shape of the rubber body 10 and which is shown as providing a near-constant rate spring as illustrated in FIGS. 4 and 5 both in its empty and loaded range of action. A constant rate spring comprises in substantially equal increments in response to equal increased increments of load, such as ¼" inch deflection for each additional 100 pounds of load. However, the spring illustrated is softer during the empty body range than when laden so that in effect a two-stage spring is also provided while at the same time the spring is near-constant in each range. Modifications in shape can also be made to have entirely different response characteristics, however.

Confining the description of the resilient rubber body 10 to its unstressed condition, it is shown as having a greater horizontal length than width and is preferably generally rectangular both in side elevation, as shown in FIG. 2, and in plan. It has a solid rubber base 15 rising from its bottom mounting face 12 to a horizontal plane designated at B-B. This base generally is rectangular in horizontal section and in vertical longitudinal section, but is trapezoidal in vertical transverse section, having side faces 16 which converge upwardly from outwardly projecting base flanges 18. A feature of the invention is the absence of bond stress between the rubber body bottom mounting face 12 and the base plate 13, this permitting the body to be secured to this base plate by C-shaped longitudinal metal base plate flanges 19 which can be formed to compressively embrace and hold onto the longitudinal rubber body side flanges 18, as shown in FIGS. 1 and 2. As also shown in these figures, the base plate 13 can have upstanding transverse end flanges 20 which bear against the vertical end faces 21 of the rubber body.

Rising integrally from the sides of the base 15 are thick longitudinal sidewalls 22 which are of equal length and transverse thickness to form symmetrical sides. The outer longitudinal side faces 23 form continuations of the upwardly converging longitudinal side faces 16 of the trapezoidal base 15 and the upper ends of these sidewalls are connected by an integral top arch 24. The exterior face 25 of this top arch is preferably of semicylindrical form and forms a continuation of the upwardly converging side faces 23 of the sidewalls 22, the line of force A being directed downwardly against the crown line of this semicylindrical arch 24 as by a flat or concave channel-shaped plate 26.

A vital feature of the present invention resides in the provision of a central opening 30 extending from the opposite end faces 21 of the rubber body 10 along a central longitudinal axis arranged transversely of the line of force A and providing symmetrically the body sidewalls 22 of substantially the same thickness transversely of the line of force A to cause these body sidewalls to expand, in use, substantially equally away from the axis of said central opening. This central opening 30 is preferably in the form of a through bore with a rounding or semicylindrical bottom face 31 based on or tangential to the plane B-B, upwardly converging side faces 32 which are preferably severally generally parallel with the external side faces 23 of the body sidewalls 22, and a rounding or semicylindrical top face 33 which is shown as concentric with the semicylindrical exterior face 25 of the arch 24 and which is tangential to a horizontal plane C-C which plane therefore defines the top of the body sidewalls 22 and the base of the integral arch 24 connecting these body sidewalls. It will be seen that the opening 30 is of rounding inverted wedge-shape in cross section extending longitudinally centrally through the body 10 and is of substantial height and breadth.

In the unstressed condition of the rubber body 10 the vertical dimension of the through opening 30 lengthwise of the line of force A or between the planes B-B and C-C is greater than its dimension transversely of this line of force. Also this vertical dimension of the opening 30 between the planes B-B and C-C is comparable to the thickness of the trapezoidal base 15, that is, between the mounting face 12 and the plane B-B. This thickness of the trapezoidal base is sufficient to avoid bond stress between mounting face 12 and the base plate 13.

The body sidewalls 22 and arch 24 are preferably at least as thick as the height of the through bore 30 (between the planes B-B and C-C), this thickness preferably does not exceed about two inches since difficulty is experienced in obtaining a good molded resilient rubber product at thicknesses greater than about two inches due to the retarded curing at greater thicknesses and also due to tying up the molds for an undue length of time.

The modification illustrated in FIG. 3 is the same as in FIGS. 1 and 2 except that the resilient rubber body 10a is vulcanized to its base plate 13a thereby eliminating the need for the retaining flanges 18, 19 and 20, FIGS. 1 and 2. Since in other respects the form of FIG. 3 is the same, the same reference numerals have been employed and distinguished by the suffix a.

OPERATION

The operation of either form of the invention is illustrated in FIGS. 4 and 5.

With the rubber body unstressed as in FIGS. 1-3, its external transverse cross-sectional form is designated by the line W, FIG. 4 and the cross-sectional shape of its central longitudinal through bore is designated by the line w. This is merely a repetition of the showing of FIGS. 1 and 3.

When, however a downward force A of, say about 3,500 pounds, is impressed on the top arch of the rubber body sufficient to depress the arch of the rubber body three-fourths inch, the external transverse shape of the rubber body becomes as illustrated by the line X, FIG. 4, and the cross-sectional shape of its through bore as illustrated by the line x, FIG. 4. Thus the top of the body is flattened by the plate 26 and the external faces 23 of the sidewalls 22 are pushed outwardly into a slightly convex form and the sidewalls 16 of the trapezoidal base 15 are also pushed outwardly into a slightly convex form. The through bore 30, however, as illustrated at x, has been very materially reduced in height and broadened in width and changed in shape from an inverted rounded wedge into the shape of an egg with its small end up. It will also be noted that the cross-sectional area of the opening has been materially reduced.

Increasing the downward force A of the plate 26 to, say, about 7,000 pounds, depresses the top of the rubber body another half inch and its external shape becomes as illustrated by the line Y, FIG. 4, and the cross-sectional shape of its through bore as illustrated by the line y, FIG. 4. Thus, the top of the body is further flattened and the external faces 23 and 16 of the sidewalls 22 and base 15 pushed outwardly into a more pronounced convex form. At the same time the height of the through opening or bore 30, line y, is reduced to less than half of its original height while it has expanded horizontally to the extent that it is now wider than it is high, having a shallow rounding bottom and an arching top of greater depth. It will also be noted that not only is the cross-sectional area of the through opening sharply reduced, but that also its bottom has been displaced below the bottom of the opening in its unstressed condition.

Increasing the downward pressure to, say, about 13,500 pounds, depresses the rubber body another half inch, or to about ⅓ of its original height, and its external shape becomes as illustrated by the line Z, FIG. 4, and the cross-sectional shape of its through bore as illustrated by the line z, FIG. 4. Thus the flat top of the body is further depressed and the external faces 23 and 16 of the sidewalls 22 and base 15 pushed outwardly into a strikingly salient form as compared with their original flat form. At the same time the through bore, line z, has been changed to be almost a horizontal slot in cross section having a horizontal width almost twice that of this bore when unstressed, line w, having a height which is only a small fraction of its original unstressed height, line w. Further, it will be noted that its bottom is almost flat with a low arching top and that this bottom is well below the bottom of the bore when the rubber body is unstressed, line w.

This is related to the freedom from bond stress between the mounting face 12 or 12a and the mounting plate 13 or 13a. Thus the trapezoidal base section 15 is a solid massive body free from any opening encouraging distortion, and it is also of sufficient depth that its internal downward pressures are not effective at the bottom longitudinal side edges to spread the mounting face horizontally. Further, this depth of the trapezoidal base 15 prevents an upward stress of the center of the mounting face 12 upwardly from the base plate 15. Without such deep base section it was found that the base section 15 tended to arch up at its longitudinal center thereby to create an upward pull away or tension bond stress between the mounting face 12 and mounting plate 13 as compared with a shear stress as might obtain between the side edges of the plate 13 and mounting face 12 if substantially other than direct downward pressure were permitted to build up at these side edges.

This freedom from bond stress between the mounting face 12 or 12a and the mounting plate 13 or 13a is important both with the vulcanized form shown in FIG. 3 and the unvulcanized or marginally held form shown in FIGS. 1 and 2. With the form of FIG. 3, of course, the absence of bond stress protects the vulcanized bond. With the form of FIGS. 1 and 2, however, it eliminates all need for a vulcanized or cementitious bond at all. In this form there is no bond between the mounting face 12 and the mounting plate 13, the function of the interlocking flanges 18, 19 being merely to hold the two parts together, as under rebound action.

The lack of necessity for a bond between the mounting face 12 and the mounting plate 13 leads to another very important attribute, namely, that the rubber bodies 10 can be extruded and then cut to length to provide a compression rubber spring of the desired capacity. Thus, since the rubber body 10 is of the uniform cross section shown in FIG. 1, it can be produced by extrusion, lengthwise of its major axis or through bore 30, curing taking place during such extrusion. The extrusion can be cut to short lengths to provide small capacity compression rubber springs, or can be cut to longer lengths to provide higher capacity compression rubber springs. In either case, they can be attached to correspondingly sized mounting plates 13 by the flanges 19 and 20 as above described.

Whether produced by extrusion, or by conventional molding as with FIG. 3, the presence of the through bore 30 or 30a, in addition to its importance in use in forced ventilation cooling the rubber body (by constantly drawing in and expelling ambient air), is of prime importance in controlling the temperature conditions in curing the rubber during molding thereof. Thus, whether by extrusion or conventional molding, the bore 30 or 30a, as well as the top and side exterior faces of the rubber body, are produced by metal molds (not shown), the temperature of which can be controlled by the introduction of coolants, or lower temperature heating media, to insure cooling of the rubber body at a rate calculated to produce a high quality, long lasting rubber compression spring under conditions of severe and constant use. This central opening 30 or 30a also permits the production of very heavy duty compression rubber springs with a maximum wall thickness of not more than about 2 inches, beyond which it is difficult to effect curing of rubber in such length of time as to insure high quality response and long life with present rubber molding techniques. Moreover, with conventional molding techniques, long curing periods involve excessive tieup of molds, and long duration curing time is obviously disadvantageous with extrusion molding.

Referring to the graph, FIG. 5, it will be noted that the shape of rubber body of FIGS. 1—4, provides a highly desirable highway vehicle compression rubber spring in that it has a near-constant spring rate. A truly constant spring rate would appear as a straight line (equal increments of deflection in response to equal increments of load). It will also be noted that the spring rate is lower during the empty vehicle range (2,000—4,000 pounds) than during the static load and dynamic shock range (4,000—13,000 pounds) thereby to provide a softer empty body ride and, in effect, a two stage spring for empty and loaded body rides.

It will therefore be seen that the present compression rubber spring has a desirable deflection rate for heavy and light duty vehicles with no rubber section more than two inches thick and with the spring compression over two-fifths of its height with no bond stress. The design also permits production of a range of spring capacities from one mold due to the cross section remaining constant, by merely blocking off part of the mold for smaller capacity springs. This constant cross section and elimination of need for vulcanization bonding also permits of extruding the rubber bodies and providing different capacity springs by merely cutting off the extrusion to appropriate lengths. It will also be noted that the height of the rubber body lengthwise of the line of force A, is approximately equal to its width along the mounting face transversely of its major axis, thereby to provide stability in action.

By "rubber" as used in the accompanying claims is meant natural rubber, synthetic rubber or a mixture of natural and synthetic rubber. The rubber is preferably 50—60 durometer.

I claim:

1. A spring suspension for supporting a member of a vehicle frame or the like upon a member of a wheeled supporting structure or the like, having a resilient rubber body with opposite first and second exterior faces interposed between said members and which provides substantially both the entire resilient support for and resistance to the movement of said frame through its empty vehicle, static load and dynamic shock ranges along a line of force applied against said first face by one of said members generally through the center of said body and through said second face against the other of said members; wherein the improvement comprises means securing said first face of said body to one of said members with said second face of said body having full time nonadhering touching contact with the other of said members, said rubber body having opposite ends and a central opening extending from said opposite ends along an axis arranged transversely of said line of force, said body including a pair of sidewalls on opposite sides of said central opening with each of said sidewalls having a minimum thickness transversely of said line of force generally less than about one half of the corresponding parallel effective lineal dimension of said first face of said body whereby said sidewalls are acted upon in the direction of said line of force substantially exclusively in compression through said empty vehicle, static load and dynamic shock ranges, the lineal effective dimensions of said first face of said body in all directions being at least substantially equal to the lineal dimension of said rubber body, when unstressed, along said line of force.

2. A spring suspension as set forth in claim 1 wherein said sidewalls are substantially straight in said direction of said line of force.

3. A spring suspension as set forth in claim 2 wherein in the unstressed condition of said body its opening is of larger dimension in said direction of said line of force than transversely thereof in a direction substantially perpendicular to said sidewalls, and changes in the fully compressed condition under dynamic shock to be of greater dimension transversely of said line of force than in said direction thereof.

4. A spring suspension as set forth in claim 2 wherein said substantially straight sidewalls converge toward each other toward said second face of said body and said opening is of corresponding wedge-shaped form in cross section whereby said sidewalls progressively become thicker as the unstressed body is progressively stressed from empty vehicle through static load to dynamic shock ranges, and progressively become thinner with the progressive diminution thereof.

5. A spring suspension as set forth in claim 1 wherein said opening is formed by surfaces which form regular and direct continuations of one another thereby to avoid V-shaped rupture-inviting grooves, particularly at places of high stress.

6. A spring suspension as set forth in claim 1 wherein said second face and said opening of said body form an arch connecting said sidewalls, said arch being shaped so that said other member progressively contacts a greater area of said second face of said body in response to increasing applied forces through substantially the entire empty vehicle, static load and dynamic shock ranges and progressively contacts a diminishing area of said second face of said body as said applied forces are relieved.

7. A spring suspension as set forth in claim 6 wherein said arch is of rounding form in the unstressed condition of said body and is generally in the form of a flat arch in the fully compressed condition of said body.

8. A spring suspension as set forth in claim 1 wherein said rubber body is provided at the external side of each sidewall adjacent said first face with a flange extending lengthwise of said opening and projecting transversely of said line of force, and said one member comprises a metal plate having C-shaped metal flanges embracing said flanges of said body.